United States Patent
Hartmann (10) Patent No.: US 6,427,990 B1
(45) Date of Patent: Aug. 6, 2002

(54) SPRING BODY

(76) Inventor: Siegbert Hartmann, Neuer Kamp 71, D-32584 Löhne (DE)

(*) Notice: Subject to any disclaimer, the term of this patent is extended or adjusted under 35 U.S.C. 154(b) by 0 days.

(21) Appl. No.: 09/523,112

(22) Filed: Mar. 10, 2000

(51) Int. Cl.$^7$ .............................. F16F 1/18; A47C 23/02
(52) U.S. Cl. ..................... 267/158; 267/103; 267/160; 5/247; 5/255
(58) Field of Search ........................... 267/158, 160, 267/103; 5/247, 255, 719

(56) References Cited

U.S. PATENT DOCUMENTS

| | | | | |
|---|---|---|---|---|
| 122,111 A | * | 12/1871 | Duffy | |
| 201,158 A | * | 3/1878 | Carter | 5/255 |
| 359,070 A | * | 3/1887 | Goewey | 5/255 |
| 1,837,828 A | * | 12/1931 | Newman et al. | 5/255 |
| 5,165,125 A | * | 11/1992 | Callaway | 5/247 |
| 5,632,473 A | | 5/1997 | Dias Magalhaes Queiroz | 267/103 |

FOREIGN PATENT DOCUMENTS

| | | |
|---|---|---|
| DE | 2 015 659 | 10/1970 |
| DE | 87 14 843 .9 U1 | 3/1988 |
| DE | 196 37 933 C1 | 1/1998 |
| FR | 2 737 096 | 1/1997 |
| WO | WO 01/15572 | 3/2001 |

* cited by examiner

*Primary Examiner*—Alexander Grosz
(74) *Attorney, Agent, or Firm*—Laurence A. Greenberg; Werner H. Stemer; Gregory L. Maybeck (57) ABSTRACT

A spring configuration of an individual-segment underspring configuration for furniture including a mattress. The spring configuration is formed of individual spring elements, each containing a supporting plate; a baseplate; a latch holder having latches; and at least one spring body connected between the supporting plate and the baseplate. The spring body has a first center, a second center spaced apart from the first center, a central axis, and cushioning arms disposed in one of a straight plane and a curved plane and extending radially outward in one of a straight manner and a curved manner from the first center and the central axis. The cushioning arms have outer ends with latching devices in a region of the second center, and, in each case in a state in which the cushioning arms are bent over in a manner of a basket in one direction toward the central axis and the second center, the latching devices of the cushioning arms engaging in and securing to the latches of the latch holder.

15 Claims, 6 Drawing Sheets

SPRING BODY

BACKGROUND OF THE INVENTION

FIELD OF THE INVENTION

The invention relates to a spring body of an individual-segment underspring configuration for furniture for sitting or lying on or for a mattress, having individual spring elements consisting in each case of a supporting plate, at least one spring body and a baseplate.

A padding element for a bed system is known from German Patent DE 297 21 656 U1 and consists of an integrally formed injection molded part, and has a complicated three-dimensional form which requires complex and costly injection molds to produce it. The ends of the leaf springs extending outward and upward from a lower baseplate are in each case provided with supporting surfaces, with the result that in the case of this known, one-piece embodiment of a padding element it is only possible to obtain a compromise between the desired spring rates and the required strength of a supporting surface.

SUMMARY OF THE INVENTION

It is accordingly an object of the invention to provide a spring body which overcomes the above-mentioned disadvantages of the prior art devices of this general type, which can be produced in a simple manner and whose cushioning properties can be adjusted selectively.

With the foregoing and other objects in view there is provided, in accordance with the invention, a spring configuration for an individual-segment underspring configuration for furniture including a mattress, including:
individual spring elements, each containing:
a supporting plate;
a baseplate;
a latch holder having latches disposed on the baseplate; and
at least one spring body connected between the supporting plate and the baseplate, the spring body having a first center, a second center spaced apart from the first center, a central axis, and cushioning arms disposed in one of a straight plane and a curved plane and extending radially outward in one of a straight manner and a curved manner from the first center and the central axis, the cushioning arms having outer ends with latching devices in a region of the second center, and, in each case in a state in which the cushioning arms are bent over in a manner of a basket in one direction toward the central axis and the second center, the latching devices of the cushioning arms engaging in and securing to the latches of the latch holder.

In the simplest case, the individual-segment underspring configuration consists of the separate spring body, the supporting plate and the baseplate. The spring body consists of cushioning arms that are disposed in a straight or else curved plane about a first center and a central axis. The cushion arms are bent over elastically in the manner of a basket toward the central axis and a second center that is at a distance from the first center. The cushion arms engage there with a latching device provided at its outer ends in latches of a latch holder and thus form a three-dimensional spring body. As a result, the spring body can be produced considerably more cost-effectively, since the injection mold can be manufactured considerably more simply, as a consequence of the spring body which is essentially two-dimensional in the starting state and is of low thickness, and also a multipart form of the press is not required. The same likewise applies to a spring body having a vertical plane of separation and whose starting product already has in shell form cushioning arms which extend toward the second center and are therefore configured in one piece. Furthermore, the spring rate can be predetermined entirely independently of the strength requirements made of the supporting plate or the baseplate for fastening an individual spring element on a transverse strut or a flat surface of furniture for sitting or lying on, since the spring body constitutes a separate component, preferably made of an elastomer, whose cushioning arms can have different shapes which influence the cushioning and damping properties of the spring body. In furniture for sitting or lying on, in particular in a bed as an underspring configuration of a mattress or else as part of the mattress, the spring elements which are constructed with the spring bodies enable zones of different hardness and spring deflections to be produced, as a result of which the performance with somebody lying thereon can be progressively improved.

The spring body preferably consists of three or more cushioning arms, it being possible to freely select the number and geometry thereof. In this configuration, it is of particular advantage that a desired cushioning hardness, spring height or spring rate can be predetermined by the number, length, the shape, the thickness and the width of the cushioning arms or else via the Shore hardness of the base material. It is thereby possible in a simple manner to produce individual spring elements having a different spring rate for the different loads in furniture for sitting or lying on or in a mattress.

Furthermore, a preferred embodiment of the subject matter of the invention is equipped within the spring body with a second spring body having shorter cushioning arms, or an additional spring or damping element is inserted in the basket-like formation produced by the latched-together cushioning arms, so that, for example, following a free spring deflection of the outer spring body having a soft spring rate, a hardening underspring configuration can be provided.

Further, radially extending connecting arms can advantageously emanate from the first center of the spring body, the ends of which connecting arms can be connected to adjacent individual spring elements in the installed state of the individual spring elements, with the result that when a central individual spring element is subjected to load, adjacent individual spring elements can be used at the same time in order to cushion this load. However, a connection of this type can also take place via separate webs connecting the supporting plates of adjacent individual spring elements to one another, with the result that an interlacing of individual spring elements can take place or be suppressed, depending on the sphere of use of the spring body.

In a preferred embodiment of the invention, the latch holder for the latches of the cushioning arms is formed in one piece with a baseplate for fastening the individual spring element on a spring slat or a flat surface, so that the number of individual parts of the simplest individual spring element to be produced is restricted to three. Further minimization of the number of components can be achieved if the upper supporting plate is configured such that it is likewise bonded to the upper center of the spring body.

According to a further embodiment of the invention, in order to produce a particularly high individual spring element, a plurality of spring bodies can also be disposed one above another, it then being possible to provide, preferably in the upper center of a spring body, latch holders for the latches of the cushioning arms of a spring body to be disposed above the spring body. Latch holders of this type can also be used as a fastening for the supporting plate.

Likewise of advantage is a version of the subject matter of the invention whose cushioning arms have lateral tabs which can be latched together with tabs of adjacent cushioning arms, as a result of which additional stability against an individual spring element yielding laterally when subjected to an oblique load is achieved.

A particularly advantageous refinement of the invention has the spring body which is configured such that it is divided either once or a number of times in a vertical central plane, enabling the basket-like spring body to be produced by the individual spring-body segments being fitted and latched together in a simple manner.

A further substantial innovation that can be emphasized is a configuration of the invention in which the whole of the spring body or part of it or else an entire individual spring element is encapsulated with latex. A latex mattress, for example, can be equipped with a component of this type, the encapsulated spring bodies or individual spring elements being inserted into a recess in the latex mattress, which is considerably lighter and substantially more air-permeable as a result. A latex mattress having inserted spring bodies or individual spring elements made of encapsulated or simple plastic can, as a result, be handled very much more simply, in contrast to heavy mattresses made entirely of latex, and also has an excellent moisture-conveying value, so that even people who perspire heavily can use a mattress of this type.

Other features which are considered as characteristic for the invention are set forth in the appended claims.

Although the invention is illustrated and described herein as embodied in a spring body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
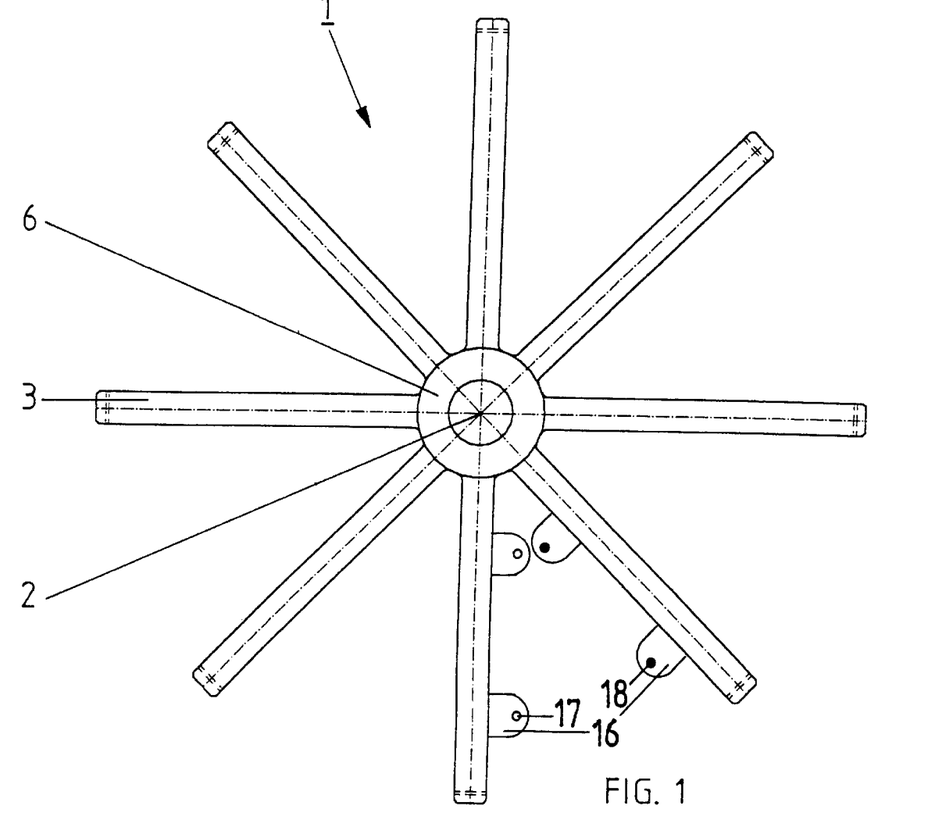
FIG. 1 is a diagrammatic, plan view of a starting product of a first spring body prior to its elastic deformation according to the invention.
Figure 4:
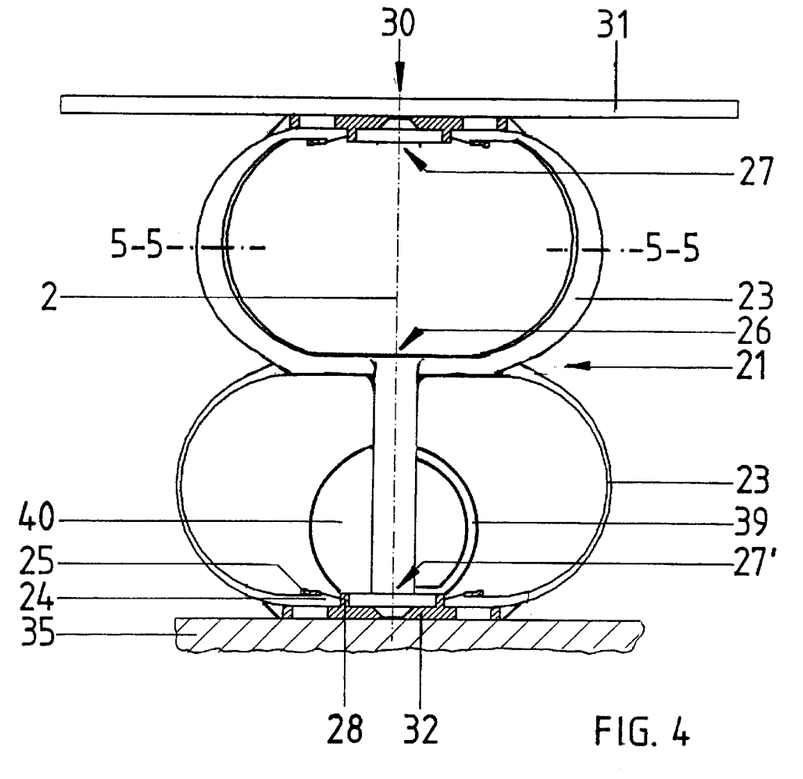
FIG. 4 is a sectional view of a second individual spring element in the installed state.
Figure 5:
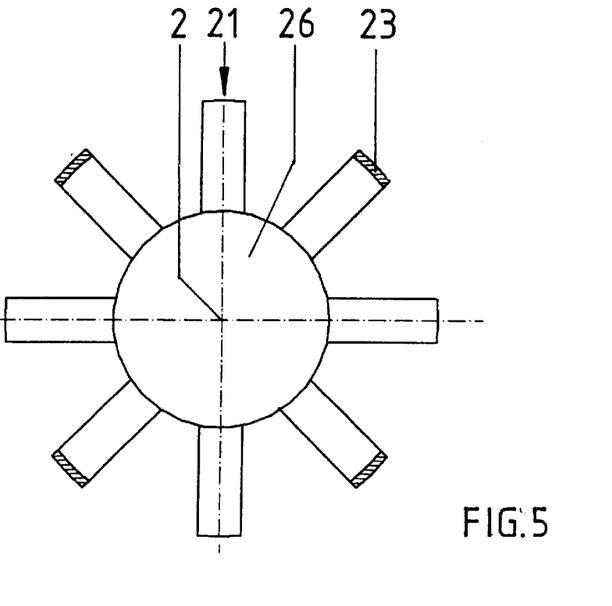
FIG. 5 is a plan view of a second spring body of the second individual spring element according to FIG. 4.
Figure 6:
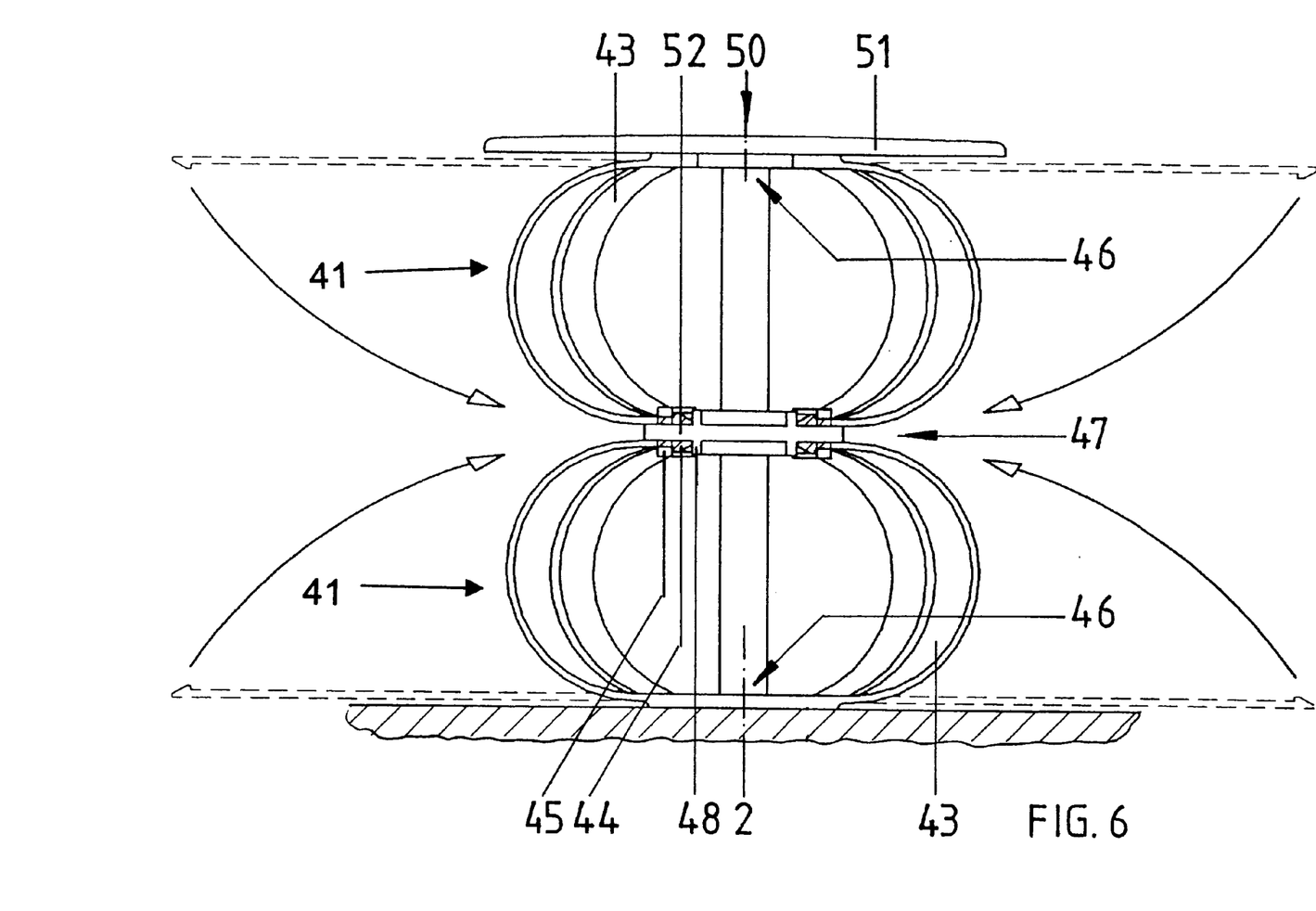
FIG. 6 is a sectional view of a third individual spring element in the installed state of a third spring body.

In all the figures of the drawing, sub-features and integral reference symbol in each case. Referring now to the figures of the drawing in detail and first, particularly, to FIGS. 2, 4 and 6 thereof, there is shown an individual spring element 10; 30; 50 of an individual-segment underspring configuration of furniture for sitting or lying on or of a mattress. The spring element 10; 30; 50 consists of a supporting plate 11; 31; 51, a baseplate 12; 32; 52 for fastening the individual spring element 10; 30; 50 on a spring slat 15 or on a flat surface 35, and at least one spring body 1; 21; 41; 61 disposed between the supporting plate 11; 31; 51 and the baseplate 12; 32; 52. In this configuration, as is illustrated in FIG. 1, the spring body 1 can be of an integral configuration and can form an individual spring basket. However, another spring body 21, as is shown in FIGS. 4 and 5, can have an integral configuration but can be formed of two spring baskets in which its cushioning arms 23 are bent over downward and upward to form a second center 27 and a third center 27'. An embodiment in which the integral spring body 1 has cushioning arms 3 which differ in length, are bent over in the same direction and are in each case latched together in two centers disposed one above the other, is conceivable, although not illustrated in the drawings. The spring element 50 can also, as is illustrated in FIG. 6, consist of two spring bodies 1 disposed one above the other, the ends of cushioning arms 43 being mounted in a common second center 47.

The spring body 1; 21; 41; 61 generally consists here of the cushioning arms 3; 23; 43; 63 which are disposed in a straight or curved plane about a first center 6; 26; 46; 66; 66' and a central axis 2, are bent over on the central axis 2 toward a second center 7; 27; 47; 67; 67' and engage there with latching devices 4; 24; 44; 64 provided at their outer ends in corresponding latches 5; 25; 45; 65 of a latch holder 8; 28; 48; 68. In order to produce a desired hardness of the underspring configuration and a desired spring rate, the cushioning arms 3; 23; 43; 63 can be of a varied configuration corresponding to their number, their shape, their thickness and width, and a starting material of a corresponding Shore hardness can be used in order to produce the spring body 1; 21; 41; 61 of a predetermined spring rate.

Figure 2:
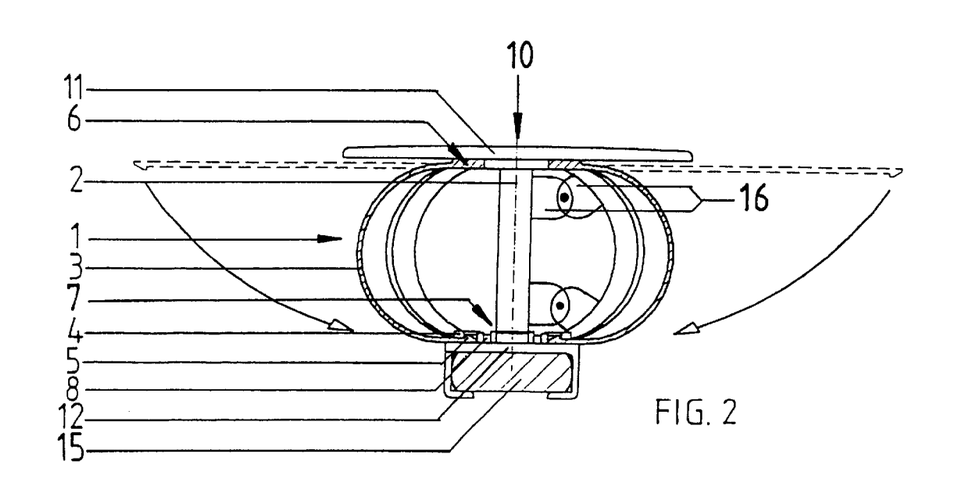
FIG. 2 is a sectional view of a first individual spring element in an assembled/installed state.

As is illustrated in FIG. 1, tabs 16 can be integrally formed on the sides of the cushioning arms 3, which tabs, in the assembled state form the spring body 1, as is shown in FIG. 2, are in mutual engagement by their latches 17, 18 and support the spring body 1 against excessive lateral deformation.

FIG. 4 illustrates a variant in which there is inserted in the spring body 21, which is of a basket-like configuration, a further basket-like spring body 39 or another damping body 40 of smaller diameter and smaller height, with which the spring rate of the entire individual spring element 30 can be set such that it clearly becomes harder after a certain spring deflection. This version is provided with two identical baseplates 32, one serving to fasten the individual spring element 30 on a flat surface 35 and one serving to fasten the supporting plate 31.

Figure 3:
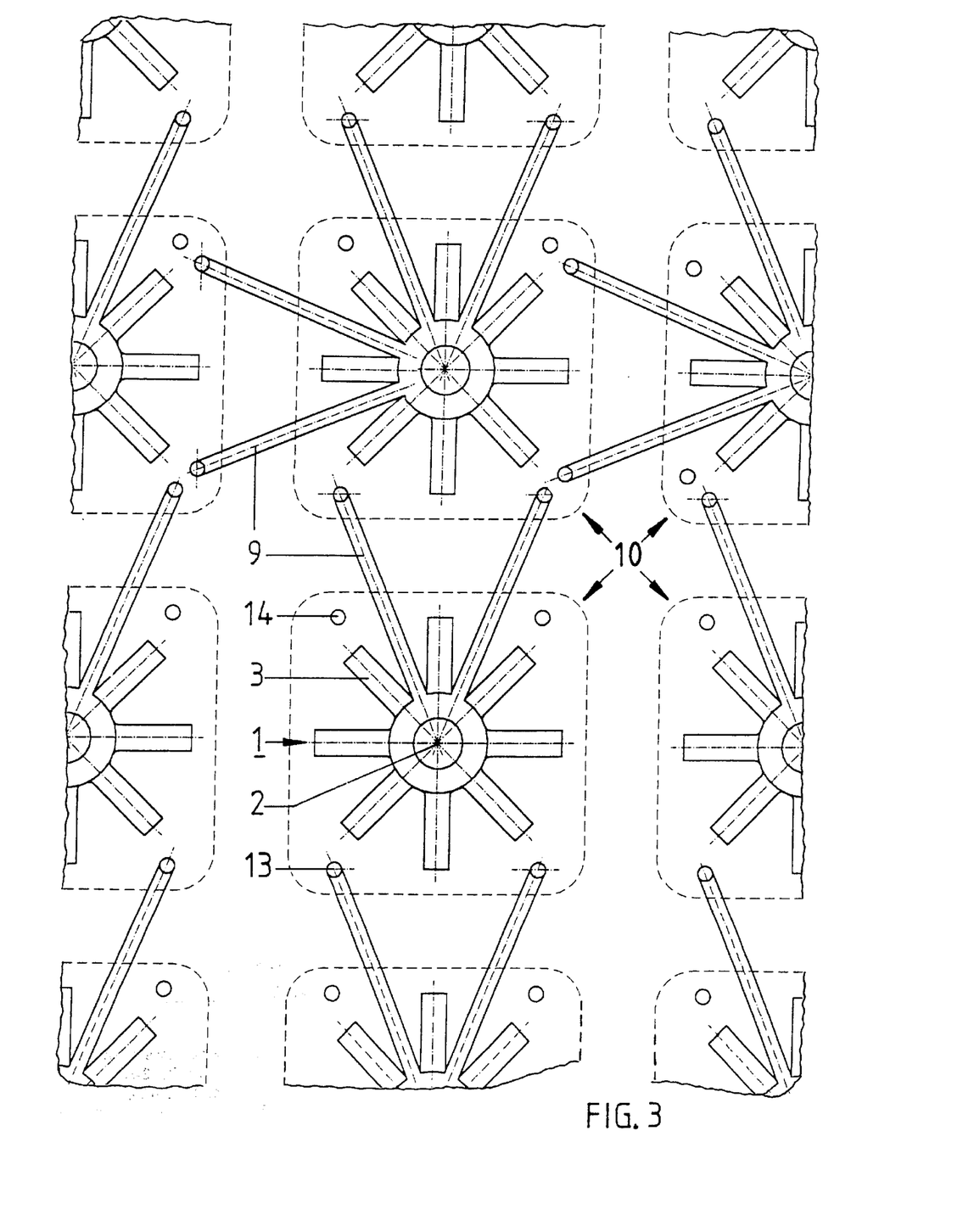
FIG. 3 is a top plan view of an individual-segment underspring configuration with individual spring elements partially interlaced.

As is illustrated in FIG. 3, further connecting arms 9 can extend radially outward from the first center 6; 26; 46; 66; 66' or from the uppermost center of an individual spring element 10; 30; 50. Ends of the further connecting arms 9 are connected to adjacent individual spring elements 10; 30; 50 in the installed state of the individual spring elements 10; 30; 50, so that all or only some of the individual spring elements 10; 30; 50 can be interlaced. For this purpose, the ends of the connecting arms 9 have latching lugs 13 which engage in corresponding latches 14 in adjacent supporting plates 11; 31; 51.

The latch holder 8; 28; 48; 68 of the spring body 1; 21; 41; 61 is formed integrally with the baseplate 12 for fastening the individual spring element 10; 30; 50 on the spring slat 15 or on the flat surface 35. The supporting plate 11; 31; 51 is secured on the spring body 1; 21; 41; 61 in the region of the upper center 6; 26; 46; 66; 66' with a form fit and/or with a force fit.

The connecting arms 9 can also be configured as separate components and in the same manner as the cushioning arms 3; 23; 43; 63. The connecting arm 9 can have longitudinal axes which deviate from a straight central axis in a coiled or curved manner, and likewise run offset from the center and rather than bending perpendicularly below their starting point from the first center, can also end offset thereto in the second center 7; 27; 47; 67; 67'.

Figure 7:
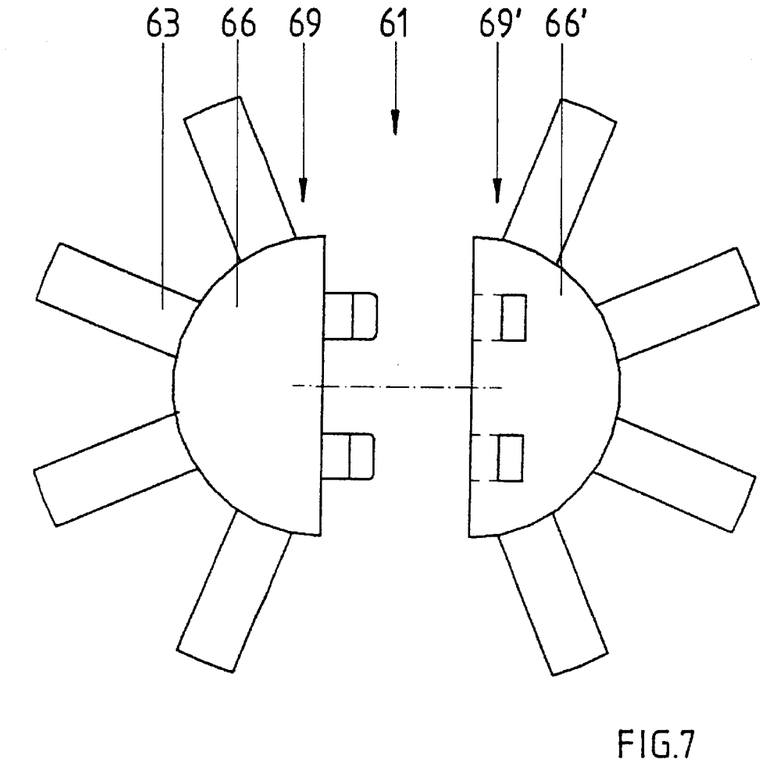
FIG. 7 is an exploded, plan view of a fourth, two-part spring body.
Figure 8:
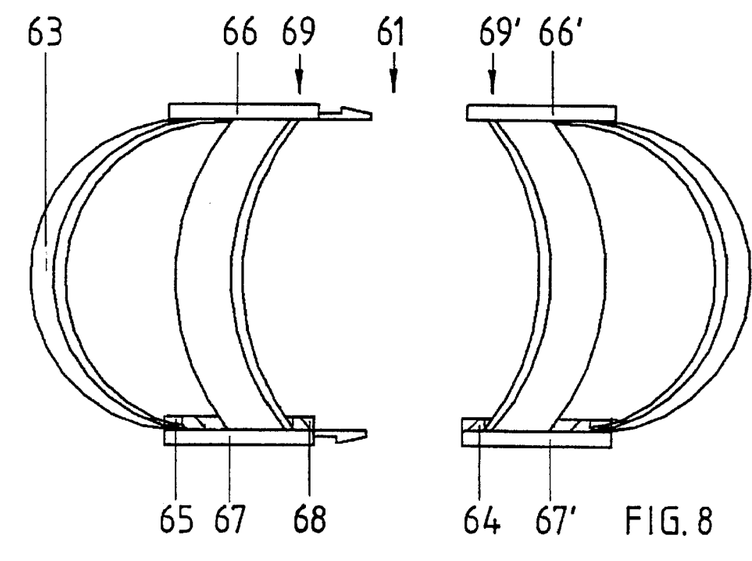
FIG. 8 is an exploded, side-elevational view of the spring body of FIG. 7.

In one version of the spring body 61, as is illustrated in FIGS. 7 and 8, the spring body 61 is configured such that it is divided in a vertical plane and consists of two or more spring-body segments 69; 69'. The cushioning arms 63 also being manufactured integrally with the first center 66 and the second center 67, and the spring-body segments 69; 69' being able to be clipped together in order to produce the spring body 61.

Figure 9:
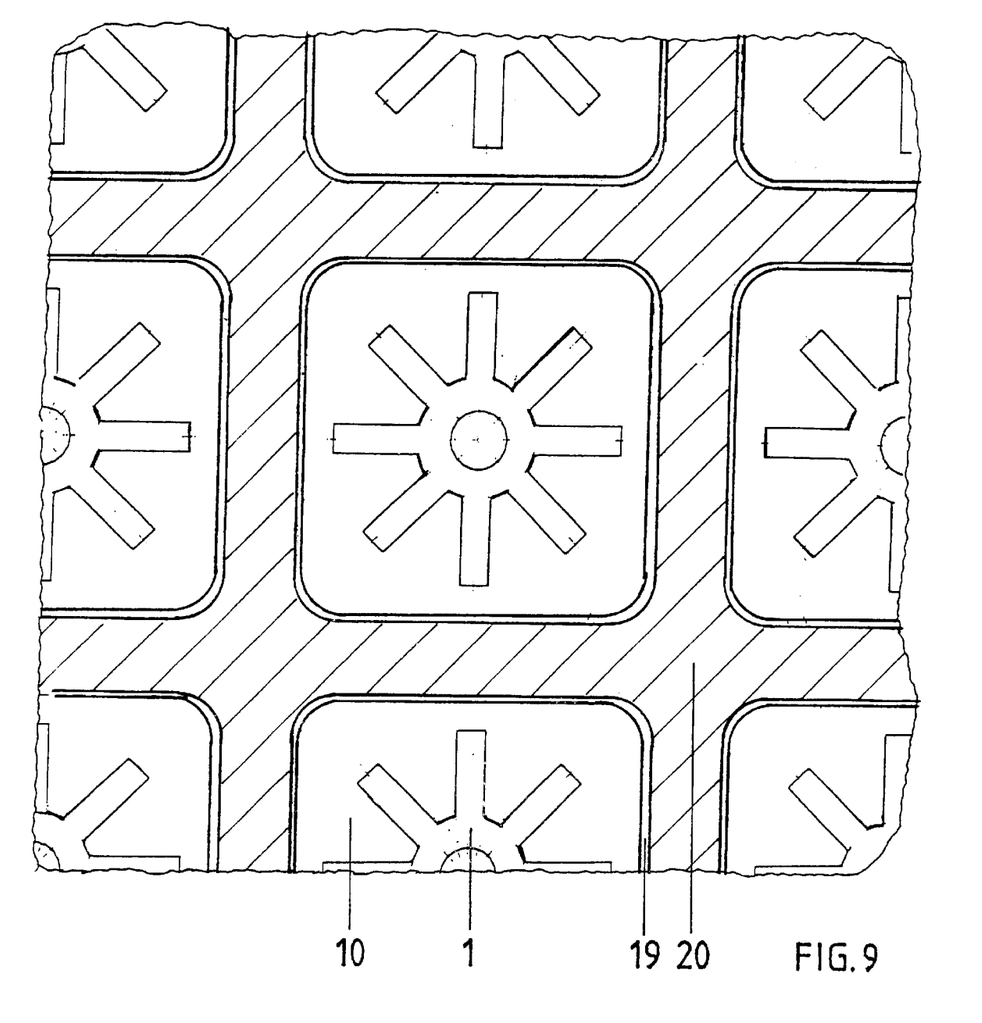
FIG. 9 is a fragmented, cutaway plan view of a latex mattress with individual spring elements inserted into recesses.

The individual spring elements 10; 30; 50 according to the invention, or else only the individual spring bodies 1; 21; 41; 61, but also other spring elements made of plastic, themselves possibly additionally encapsulated with latex, can, as is illustrated in FIG. 9, be inserted into recesses 19 in a latex mattress 20, so that their deadweight is reduced and the air exchange in the mattress is substantially improved to give better conveying of moisture.

I claim:

1. A spring configuration for an individual-segment underspring configuration for furniture including a mattress, comprising:

individual spring elements, each containing:
a supporting plate;
a baseplate;
a latch holder having latches disposed on said baseplate; and
at least one spring body connected between said supporting plate and said baseplate, said spring body having a first center, a second center spaced apart from said first center, a central axis, and cushioning arms disposed in one of a straight plane and a curved plane and extending radially outward in one of a straight manner and a curved manner from said first center and said central axis, said cushioning arms having outer ends with latching devices in a region of said second center, and, in each case in a state in which said cushioning arms are bent over in a manner of a basket in one direction toward said central axis and said second center, said latching devices of said cushioning arms engaging in and securing to said latches of said latch holder.

2. The spring configuration according to claim 1, wherein said cushioning arms are at least two cushioning arms.

3. The spring configuration according to claim 1, wherein said individual spring elements have a desired hardness, a spring height and a spring rate predetermined by at least one of a number of said cushioning arms, a length of said cushioning arms, a shape of said cushioning arms, a thickness of said cushioning arms, a width of said cushioning arms and a Shore hardness of materials forming said cushioning arms.

4. The spring configuration according to claim 1, including a smaller spring body having at least one of further cushioning arms being shorter than said cushioning arms, an additional spring and a damping element, said smaller spring body disposed between said first center and said second center of said spring body.

5. The spring configuration according to claim 1, including radially extending connecting arms emanating from said first center, said connecting arms having ends connected to adjacent ones of said individual spring elements in an installed state of said individual spring elements.

6. The spring configuration according to claim 5, wherein said support plate has latches, and said ends of said connecting arms have latching lugs engaging in corresponding ones of said latches in said supporting plate of adjacent individual spring elements.

7. The spring configuration according to claim 1, including a spring slat, said latch holder with said latches being formed in one piece with said baseplate for fastening said individual spring elements on said spring slat.

8. The spring configuration according to claim 1, wherein said supporting plate is secured on said first center by one of a force fit, a form fit and bonding.

9. The spring configuration according to claim 1, wherein said at least one spring body is at least two spring bodies disposed one above another.

10. The spring configuration according to claim 1, wherein said cushioning arms have lateral tabs with latches corresponding to a lateral tab of an adjacent cushioning arm and are latched together in an assembled state of said spring body.

11. The spring configuration according to claim 1, including a material selected from the group consisting of a latex material and a material having properties substantially equivalent to latex for encapsulating said cushioning arms.

12. The spring configuration according to claim 1, wherein at said at least one spring body is at least two spring bodies disposed one inside another.

13. The spring configuration according to claim 1, wherein said latch holder with said latches being formed in one piece with said baseplate for fastening said individual spring elements to a flat surface.

14. The spring configuration according to claim 1, including a material selected from the group consisting of a latex material and a material having properties substantially equivalent to latex for encapsulating said individual spring elements.

15. A spring configuration of an individual-segment underspring configuration for furniture including a mattress, comprising:

individual spring elements, each containing:
a supporting plate;
a baseplate;
a latch holder having latches; and
at least one spring body connected between said supporting plate and said baseplate, said spring body having a first center, a second center spaced from said first center, a third center spaced from said first center, a central axis, and cushioning arms disposed in one of a straight plane and a curved plane and extending radially outward in one of a straight manner and a curved manner from said first center and said central axis, said cushioning arms having outer ends with latching devices, and, in each case in a state in which said cushioning arms being bent over in a manner of a basket in two opposite directions toward said second center and said third center, said latching devices of said cushion arms engage in said second center and said third center with said latches of said latch holder.

* * * * *